No. 672,294. Patented Apr. 16, 1901.
G. H. SOMMER.
SHOVEL CULTIVATOR.
(Application filed Mar. 6, 1900.)
(No Model.)
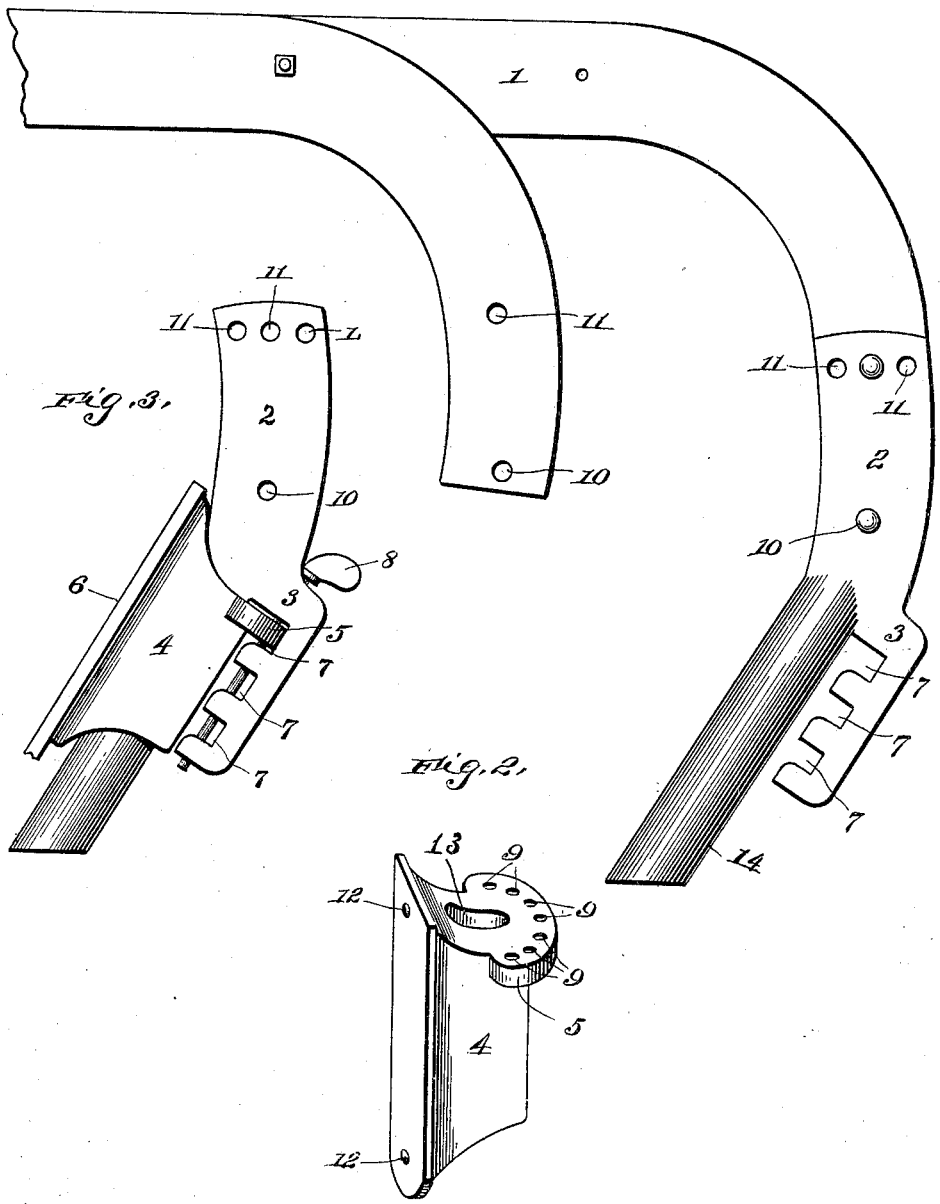

UNITED STATES PATENT OFFICE.

GEORGE H. SOMMER, OF BELVUE, KANSAS.

SHOVEL-CULTIVATOR.

SPECIFICATION forming part of Letters Patent No. 672,294, dated April 16, 1901.

Application filed March 6, 1900. Serial No. 7,445. (No model.)

*To all whom it may concern:*

Be it known that I, GEORGE H. SOMMER, a citizen of the United States, residing at Belvue, in the county of Pottawatomie and State of Kansas, have invented a new and useful Improvement in Shovel-Cultivators, of which the following is a specification.

My invention relates to an improvement in shovel-cultivators, having particular reference to the means of adjusting the shovels.

In the class of shovel-cultivators most commonly in use the shovels are adjusted by means of a bolt or screw; but much trouble is experienced in adjusting the shovels in that manner, as it takes considerable time to get the shovels on a cultivator adjusted uniformly, and, again, the shovel or shovels while striking a hard object will be forced out of their adjusted position or the bolt or screw will become loose while in operation or become rusty, so as to make it impossible for the operator to adjust the shovels or shovel properly.

The object of my invention is to provide for a more quick, secure, accurate, and uniform adjustment of the shovels. I attain this object by the mechanism illustrated in the accompanying drawings, in which—

Figure I is a side elevation of an old-style shovel-cultivator beam, front part being broken away, with shovel-shank attached. Fig. II is a perspective view of a coupling-block with perforated rim or sector. Fig. III is a side projection of the shovel-shank and its adjusting device.

Similar numerals refer to similar parts throughout the several views.

1 designates a two-shovel cultivator-beam (front part being broken away) to which is attached the shovel-shank 2, having a downwardly-extending rack 3 for receiving the perforated rim or sector 5, which is secured to the coupling-block 4, carrying the adjustable shovel 6. The shovel 6, which is attached to the coupling-block 4, is horizontally and vertically adjustable on the shovel-shank 2 without the aid or use of a wrench. I prefer to carry out this feature of my invention in the manner as shown in Fig. III, where it will be seen that the back part of shovel-shank 2 is provided with a rack 3, being secured with its upper end to said shank, leaving an opening at its lower end, so as to allow the coupling-block 4 to pass in between the shank 2 and the rack 3 when shovel 6 is attached.

The upper end of the coupling-block 4 is provided with a perforated rim or sector 5, which passes horizontally through one of the notches 7, located on the inside of the rack 3, a locking-bolt 8 passing downwardly through the rack 3 and the perforated rim or sector 5. The most accurate and uniform adjustment of the shovels can be effected by the use of this adjusting device.

When that portion of the coupling-block 4 which lies in between the shovel 6 (lower part of shovel being broken away) and the rim or sector 5 is in a vertical line with the rack 3, the shovel 6 may be attached or detached, or it may be adjusted vertically by bringing the rim or sector 5 to any desired notch on rack 3, and then turning the shovel 6 around to the front of shovel-shank 2. This action will bring the rim or sector 5 in the desired notch on rack 3 and to any desired position horizontally.

The locking-bolt 8, which passes downwardly through the rack 3 and the perforated rim or sector 5, prevents the shovel 6 from being forced out of its adjusted position, as seen in Fig. III.

13 is a central opening in block 4 for the reception of the projecting rod or shaft 14 on the shank 2, upon which the block 4 is journaled.

10 and 11 are openings for bolts to attach shovel-shank 2 to cultivator-beam 1.

12 represents openings for bolts or rivets to attach shovel 6 to coupling-block 4.

It will be obvious to any skilled mechanic after reading this specification and considering the accompanying drawings that the details of construction may be modified to a very great extent without passing beyond the limits of the invention, which includes any form of a shovel-adjusting device provided with a rack, a locking-bolt, and a perforated rim or sector for adjusting the shovel horizontally and vertically and preventing the shovel from moving up or down on the shank.

Having thus described my invention, what I claim, and desire to secure by Letters Patent, is—

In a shovel-cultivator a shank, having a projecting shaft 14, and a rack 3, in combination with a coupling-block 4, journaled upon the projecting shaft 14, provided with a perforated sector 5, interlocking with the rack 3, a locking-bolt 8, passing downwardly through the rack 3, and the perforated sector 5, for holding said sector interlocked with said rack, substantially as set forth.

In testimony whereof I hereunto set my hand, this 27th day of June, 1899, in the presence of two attesting witnesses.

GEORGE H. SOMMER.

Witnesses:
 IRVING SNOOK,
 JOHN KAUTZ.